United States Patent Office 3,424,763
Patented Jan. 28, 1969

3,424,763
FUSED CYCLOALKANECYCLOHEXANEDIONES AND FUSED CYCLOALKANECYCLOHEXENE-DIONES
James C. Martin and Robert D. Burpitt, Kingsport, Tenn., assignors to Eastman Kodak Company, Rochester, N.Y., a corporation of New Jersey
No Drawing. Filed Feb. 28, 1966, Ser. No. 529,942
U.S. Cl. 260—326.5            6 Claims
Int. Cl. C09j 3/00; C07c 97/06

ABSTRACT OF THE DISCLOSURE

Fused cycloalkanecyclohexanediones and their manufacture by the reaction of a lactone dimer of a ketoketene with a cyclic enamine. The fused cycloalkanecyclohexanediones are corrosion inhibitors and intermediates for the manufacture of cycloalkanecyclohexenediones which are plasticizers.

---

This invention relates to certain substitued amino fused cycloalkanecyclohexanediones and fused cycloalkanecyclohexenediones as novel compositions of matter. It further relates to a process for combining lactone dimers of ketoketenes with certain cyclic enamines to produce the substituted amino fused cycloalkanecyclohexanediones and fused cycloalkanecyclohexenediones.

A review of the literature reveals that the compounds of this invention have not been reported. However, work has been done in this general area. Hünig et al., Chem. Ber., 94, 486 (1961) describes the reaction of diketene with cyclic enamines and hypothesizes that a particular compound is an intermediate in the reaction. However, these workers were not able to detect a finite existence of the hypothesized intermediate.

It is an object of this invention to provide certain substituted amino fused cycloalkanecyclohexanediones and certain fused cycloalkanecyclohexenediones as new compositions of matter.

Another object of this invention is to provide a method for combining lactone dimers of ketoketenes with certain cyclic enamines to provide certain substituted amino fused cycloalkanecyclohexanediones.

Yet another object is to provide a method for converting these same substituted amino fused cycloalkanecyclohexanediones into fused cycloalkanecyclohexenediones by loss of the substituted amine moiety.

These and other objects are obtained by the practice of this invention which, briefly, comprises combining a cyclic enamine with a lactone dimer of a ketoketene and isolating the substituted amino fused cycloalkanecyclohexanediones by recrystallation or distillation. Conversion of these materials to the fused cycloalkanecyclohexenediones is accomplished by heating, prolonged standing, or treatment with a strong anhydrous base.

More specifically, the certain substituted amino fused cycloalkanecyclohexanediones which subsequently may be converted to certain fused cycloalkanecyclohexenediones, are obtained by reacting lactone dimers of ketoketenes having the formula:

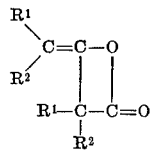

with enamines having the formula:

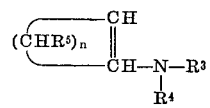

and providing substituted amino fused cycloalkanecyclohexanediones having the formula:

STRUCTURE 1

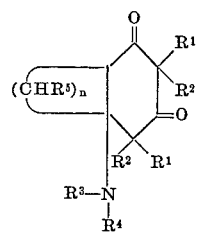

which may be converted by heating, by prolonged standing, or by treatment with a strong anhydrous base to fused cycloalkanecyclohexenediones having the formula:

STRUCTURE 2

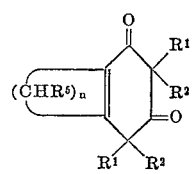

wherein $n$ is an integer from 3 to 10; each of the substituents $R^1$ and $R^2$, when taken singly, is selected from the group consisting of alkyl, preferably having from 1 to 8 carbon atoms and mononuclear aryl having from 6 to 10 carbon atoms; and the substituents $R^1$ and $R^2$, when taken collectively with the carbon atom to which they are attached, represent joined alkylene groups completing a carbocyclic ring of from 4 to 6 carbon atoms; each of the substituents $R^5$ is selected from the group consisting of hydrogen and alkyl having from 1 to 4 carbon atoms; each of the substituents $R^3$ and $R^4$, when taken singly, is alkyl having from 1 to 10 carbon atoms or aryl of 6 to 10 carbon atoms and the substittuents $R^3$ and $R^4$, when taken collectively with the nitrogen atom to which they are attached, represent a heterocyclic group having from 4 to 6 ring atoms.

In the case of $R^5$, it is meant that there can be different mixtures or combinations of hydrogen and alkyl on the ring to form a particular compound. For instance where $n$ is 5 then $R^5$ may consist of one hydrogen and the rest alkyl such as methyl and ethyl radicals in varying combinations, etc.

The unsaturated lactones that are suitable for use in the present invention are lactone dimers of ketoketenes. They are well-known compounds and their preparations are described in U.S. Patent Nos. 3,062,836 and 3,062,837. Suitable compounds include the lactone dimers of the following ketenes: diphenylketene, dimethylketene; diethylketene, methylpropylketene, ethylmethylketene, butylethylketene, isobutylethylketene, dibutylketene, butylhexylketene, dioctylketene, pentamethyleneketene, tetramethyleneketene, etc.

The cyclic enamines that are suitable for use in the present invention are well-known compounds and convenient preparations of several of them are described by Stork et al., J. Am. Chem. Soc., 85, 207 (1963). The compounds that may be used include the following enamines of cyclic ketones: pyrrolidine enamine of cyclopentanone, morpholine enamine of cyclobutanone, pyrrolidine enamine of cyclobutanone, pyrrolidine enamine of cyclohexanone, morpholine enamine of cyclohexanone, N-methylaniline enamine of cyclohexanone, hexamethylene imine enamine of cyclohexanone, pyrrolidine enamine of 2-methylcyclohexanone, piperidine enamine of 3-methylcyclohexanone, pyrrolidine enamine of 4-methoxycyclohexanone, dimethylamine enamine of cycloheptanone, pyrrolidine enamine of cycloöctanone, pyrrolidine enamine of cyclododecanone, etc.

The particular structure of the individual reactants governs the conditions used and determines to some extent whether structure 1 or 2 is obtained. Some variations of structure 1 show unusual stability and elimination of the amine moiety to give structure 2 is quite difficult and slow. Other variations in structure make it very difficult to isolate 1, the reaction from 1 to 2 being very fast. It has been found that continuous removal of the amine from the reaction system aids the reaction 1→2. The reaction of 1→2 is also catalyzed by basic substances, generally used in the amount of from 0.1 to 5%. The use of these catalysts permits the reaction to proceed more quickly and at lower temperatures. Suitable catalysts include a variety of basic materials such as: sodium methoxide, potassium tertbutoxide, sodium ethoxide, sodium hydride, dimethylsulfoxide anion, and generally alkaline earth alkoxide.

In the practice of this invention temperatures in the range of 20 to 150° C. are generally used. The reaction may be run either with or without a solvent. Suitable solvents include esters, ethers, aromatic and aliphatic hydrocarbons and chlorinated hydrocarbons, nitriles and dipolar aprotic solvents as dimethylsulfoxide, dimethylformamide, propylene carbonate, tetramethylene sulfone, etc.

A molar ratio of reactants of 1:1 is generally employed but different ratios are also operative.

The substituted amino fused cycloalkanecyclohexanediones of the present invention are useful as corrosion inhibitors for ferrous alloys and as intermediates in the preparation of the cycloalkanecyclohexanediones of our invention. The cycloalkanecyclohexenediones are useful as plasticizers for cellulose ester resins.

The following examples illustrate preferred embodiments of our invention.

Example 1

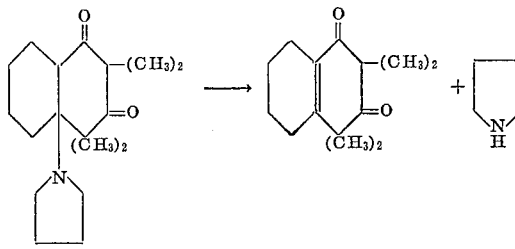

N-(1-cyclohexenyl)pyrrolidine (37.5 g., 0.25 mole) and 2,2,4-trimethyl-3-hydroxy-3-pentenoic acid β-lactone (35 g., 0.25 mole) were combined and heated on a steam bath overnight under a nitrogen atmosphere. When the mixture was cooled, a solid resulted which was filtered to give 58 g. (80%) of decahydro-2,2,4,4-tetramethyl-4a-(1-pyrrolidinyl)-1,3 - naphthalenedione, M.P. 113–114°. The product has infrared absorptions (KBr) at 5.84 and 5.96μ. The n.m.r. spectrum shows peaks (run in pyridine solvent; peak positions relative to internal tetramethylsilane) at 1.27, 1.34, and 1.39 p.p.m. for the gem dimethyl groups, peaks at 1.65 and 3.04 p.p.m. for the —CH₂— groups of the pyrrolidine ring, and a peak centered at 3.37 p.p.m. for the tertiary proton. The n.m.r. of the product in benzene shows peaks at 1.00, 1.22, 1.27 and 1.38 p.p.m. for the gem-dimethyl groups.

*Analysis.*—Calcd. for $C_{18}H_{29}NO_2$: C, 74.3; H, 10.0; N, 4.8; mol. wt., 291. Found: C, 74.2; H, 10.0; N, 4.8; mol. wt., 304.

When this reaction was run in refluxing acetonitrile essentially the same results were obtained.

Example 2

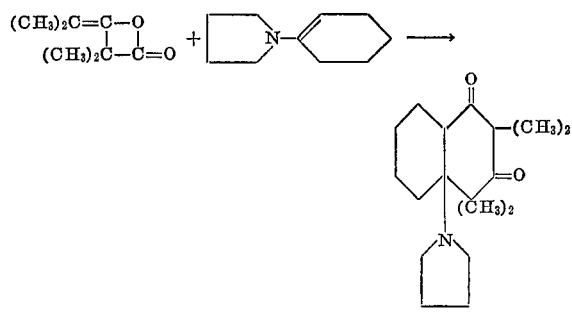

Decahydro-2,2,4,4-tetramethyl-4a-(1-pyrrolidinyl) - 1,3-naphthalenedione (79 g., 0.27 mole) was allowed to stand at room temperature for 5 weeks. During this time it changed from a solid to an oil. Distillation of the oil gave, after removal of a 16 g. forerun rich in pyrrolidine, 52 g. (87.6%) of 2,4,5,6,7,8-hexahydro-2,2,4,4-tetramethyl-1,3-naphthalenedione, B.P. 95° (0.6 mm.), $n_D^{20}$ 1.5115. The product has infrared absorption at 5.88, 6.03 and 6.18μ. The n.m.r. spectrum shows peaks for the gem-dimethyl groups at 1.26 and 1.37 p.p.m. (relative to internal tetramethylsilane) and peaks at 1.72 and 2.40 p.p.m. for the —CH₂— groups of the cyclohexene ring.

*Analysis.*—Calcd. for $C_{14}H_{20}O_2$: C, 76.3; H, 9.2. Found: C, 75.8; H, 9.6.

A solution of decahydro-2,2,4,4-tetramethyl-4a-(1-pyrrolidinyl)-1,3-naphthalenedione (15 g., 0.052 mole) in benzene (50 ml.) containing sodium methoxide (0.2 g.) was refluxed for 1 hour. The solvent and pyrrolidine were removed under reduced pressure. An infrared spectrum on the residue (11.5 g.) was identical to the spectrum on 2,4,5,6,7,8-hexahydro-2,2,4,4-tetramethyl-1,3-naphthalenedione.

Treatment of the analogous dimethylamino compound under similar conditions led to the rapid evaluation of dimethylamine and formation of the same naphthalenedione.

Example 3

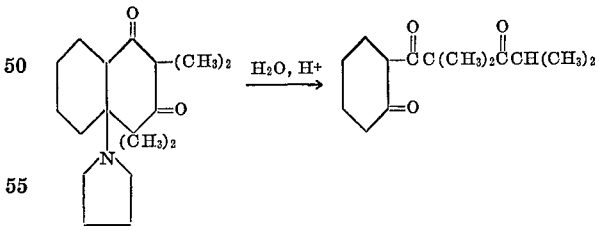

Freshly prepared decahydro-2,2,4,4-tetramethyl-4a - (1-pyrrolidinyl)-1,3-naphthalenedione (25 g., 0.086 mole) was combined with a solution of 30 ml. of concentrated hydrochloric acid in 40 ml. of water and the resulting solution allowed to stand overnight and then heated on the steam bath for approximately 2.5 hours. After cooling, the mixture was extracted with ether and the ethereal extract evaporated on the steam bath. The residue crystallized to give 15 g. (73%) of 2,2,4-trimethyl-1-(2-oxocyclohexyl)-1,3-pentanedione. A sample recrystallized from pentane-ether melted at 104–105° C. The product has infrared absorptions (KBr) at 3.0 and 6.2–6.23μ. The n.m.r. spectrum shows a peak at 1.04 p.p.m. for the isopropyl methyl groups, a peak at 2.80 p.p.m. for the tertiary proton of the isopropyl group, a peak at 1.34 p.p.m. for the gem-dimethyl group, peaks at 2.25 and 1.68 p.p.m. for the —CH₂— groups of the cyclohexane ring, and a peak at 16.50 p.p.m. indicating the presence of some enol.

*Analysis.*—Calcd. for $C_{14}H_{22}O_3$: C, 70.6; H, 9.3. Found: C, 70.8; H, 9.6.

Examples 1 and 2 show the preparation of a type I compound with a limited stability. The following example shows a type I compound of much greater stability.

Example 4

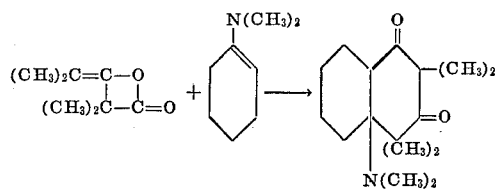

N,N-dimethyl(1-cyclohexenyl)amine (25 g., 0.2 mole) and 2,2,4-trimethyl-3-hydroxy-3-pentenoic acid β-lactone (28 g., 0.2 mole) were combined and heated on the steam bath overnight under a nitrogen atmosphere. When the mixture was cooled, the solid that resulted was filtered to give 28 g. (53%) of decahydro-4a-dimethylamino-2,2,4,4-tetramethyl-1,3-naphthalenedione. A sample recrystallized from hexane-benzene melted at 149–150° C. The infrared spectrum shows bands at 5.87 and 5.98μ.

*Analysis.*—Calcd. for $C_{16}H_{27}NO_2$: C, 72.4; H, 10.3; N, 5.3. Found: C, 72.2; H, 10.6; N, 5.3.

This compound, on standing for 3 months did not eliminate the secondary amine as did the analogous pyrrolidine derivative of Example 1.

Example 5

Under the general conditions of Example 1, the following cyclic enamines and lactone dimers of ketoketenes give the products shown:

TABLE—Continued

| Enamines | Lactone | Product |
|---|---|---|
| 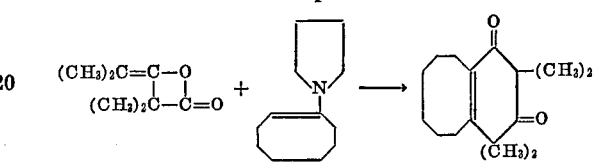 | (CH₃)₂C=C—O<br>(CH₃)₂C—C=O | |

Example 6

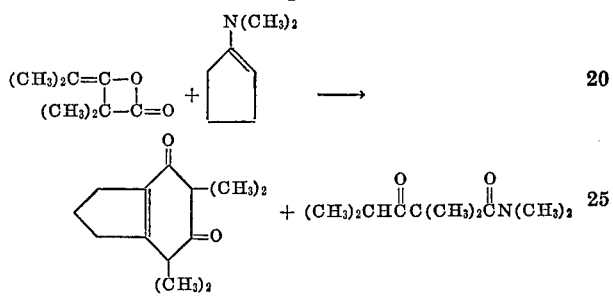

N,N-dimethyl(1 - cyclopentenyl)amine (22.5 g., 0.2 mole) and 2,2,4-trimethyl-3-hydroxy-3-pentenoic acid β-lactone (28 g., 0.2 mole) were combined and heated on a steam bath overnight under a nitrogen atmosphere. The mixture was distilled to give, after removal of a 3 g. forerun, 36 g. of material, B.P. 67–87° (ca. 1 mm.). Gas chromatography indicated this material to be a mixture consisting of approximately 50% 2,2,4-trimethyl-3-oxo-N,N-dimethylvaleramide, 40% of 5,7-dihydro-5,5,7,7-tetramethyl-4,6-indandione, and 10% of unidentified material. The yield of the indandione would be about 57% based on 0.1 of starting β-lactone.

Distillation of the 36 g. of material gave the following results:

(1) 15.5 g., B.P. 51.5–58° (0.3 mm.). Gas chromatography indicated that the material was impure. N.m.r. and infrared spectra indicated, however, that the compound was 2,2,4-trimethyl-3-oxo-N,N-dimethylvaleramide.

(2) 7.5 g. intermediate fraction.

(3) 10 g. of residue which was distilled in a semi-micro apparatus to give 7 g. of 5,7-dihydro-5,5,7,7-tetramethyl-4,6-indandione, B.P. 81–83° (0.28–0.3 mm.), $n_D^{20}$ 1.5080.

This product has infrared absorption at 5.9μ and a doublet centered at about 6.1μ. The n.m.r. spectrum shows peaks for the gem-dimethyl groups at 1.23 and 1.36 p.p.m. (relative to internal tetramethylsilane) and peaks at 2.03 and 2.71 p.p.m. for the —CH₂— groups of the cyclohexane ring.

*Analysis.*—Calcd. for C₁₃H₁₈O₂: C, 75.5; H, 8.8. Found: C, 75.6; H, 8.7.

Example 7

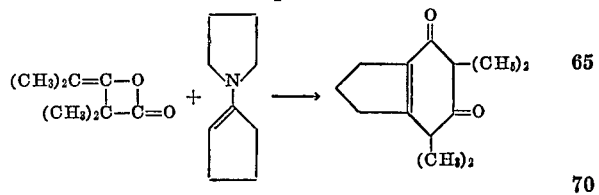

Under the general conditions of Example 6, N-(1-cyclopentyl)pyrrolidine (27.4 g., 0.2 mole) and 2,2,4-trimethyl-3-hydroxy-3-pentenoic acid β-lactone (28 g., 0.2 mole) gave a good yield of 5,7-dihydro-5,5,7,7-tetramethyl-4,6-indandione.

Example 8

Under the general conditions of Example 6, N-(1-cyclooctenyl)pyrrolidine (18 g., 0.1 mole) and 2,2,4-trimethyl-3-hydroxy-3-pentenoic acid β-lactone (14 g., 0.1 mole) gave 5,6,7,8,9,10 - hexahydro - 2,2,4,4 - tetramethyl-1,3-(2H,4H)-benzocyclooctenedione.

Example 9

The following adducts of Example 5 eliminate amine upon heating at 120° for 6 hr. to give the products shown:

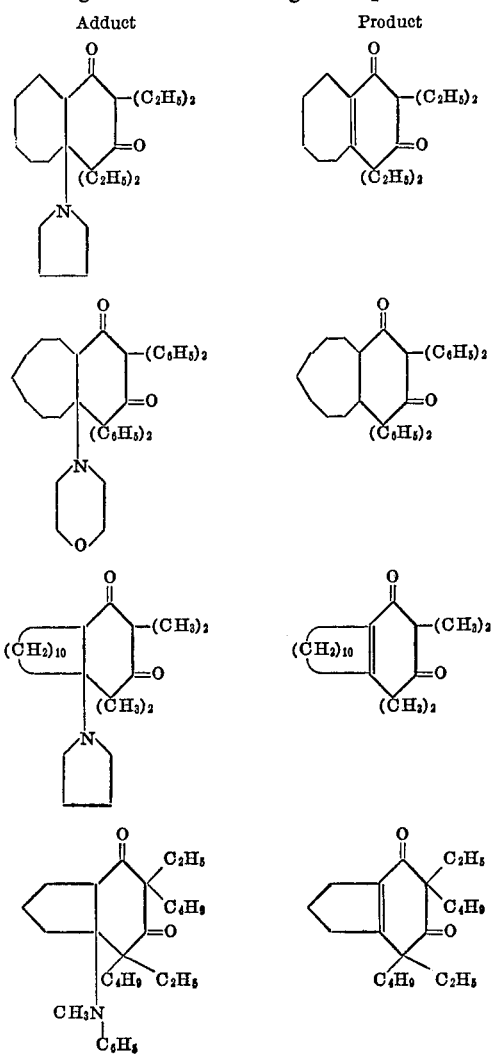

Adduct

Product

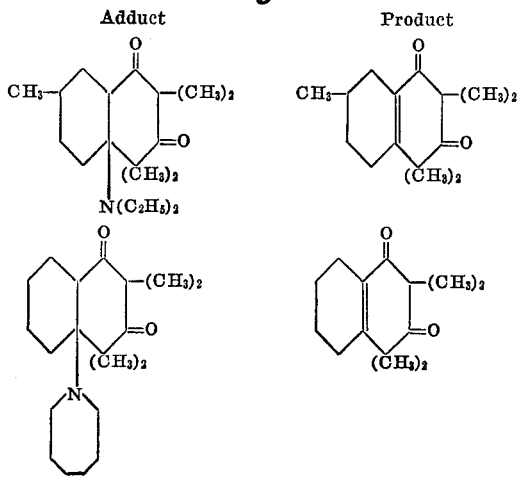

Example 10

Twenty parts of 2,4,5,6,7,8-hexahydro-2,2,4,4-tetramethyl-1,3-naphthalenedione (Example 2) and 80 parts of cellulose acetate butyrate are milled together on heated rolls. The resulting resin is quite tough and can be molded into useful objects having good impact strength.

Although the invention has been described in considerable detail with particular reference to certain preferred embodiments thereof, variations and modifications can be effected within the spirit and scope of the invention as described hereinbefore, and as defined in the appended claims.

We claim:
1. A compound having the formula:

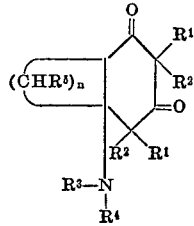

wherein $n$ is an integer from 3 to 10; each of the substituents $R^1$ and $R^2$ is selected from the group consisting of alkyl of 1 to 8 carbon atoms and phenyl; each of the substituents $R^5$ is selected from the group consisting of hydrogen, and methyl; each of the substituents $R^3$ and $R^4$, when taken singly, is selected from the group consisting of alkyl having from 1 to 10 carbon atoms or phenyl; and the substituents $R^3$ and $R^4$, when taken collectively with the nitrogen atom to which they are attached, represent a heterocyclic group selected from pyrrolidino, piperidino and morpholino.

2. A compound as defined in claim 1 having the formula:

3. A compound as defined in claim 1 having the formula:

4. A process according to claim 6 wherein the temperature of the mixture is maintained within the range of 20 to 150° C.

5. A process according to claim 7 in which the product is isolated by crystallization.

6. A process for preparing a compound as defined in claim 1 which comprises contacting a ketoketene dimer having the formula:

with an enamine having the formula:

wherein $n$ is an integer from 3 to 10; each of the substituents $R^1$ and $R^2$ is selected from the group consisting of alkyl having from 1 to 8 carbon atoms and phenyl; each of the substituents $R^5$ is selected from the group consisting of hydrogen and methyl; each of the substituents $R^3$ and $R^4$, when taken singly, is an alkyl having from 1 to 10 carbon atoms or phenyl; and the substituents $R^3$ and $R^4$, when taken collectively with the nitrogen atom to which they are attached, represent a heterocyclic group selected from pyrrolidino, piperidino and morpholino.

References Cited
UNITED STATES PATENTS
3,135,799    6/1964    Bencze _____ 260—296

HENRY R. JILES, *Primary Examiner.*
A. L. ROTMAN, *Assistant Examiner.*

U.S. Cl. X.R.
260—294.7, 247.7, 563, 343.9, 32.6, 32.8, 570.5, 576; 252—403; 106—14

UNITED STATES PATENT OFFICE
CERTIFICATE OF CORRECTION

Patent No. 3,424,763                              January 28, 1969

James C. Martin et al.

It is certified that error appears in the above identified patent and that said Letters Patent are hereby corrected as shown below:

Column 6, in the table, third column, the fourth formula should appear as shown below:

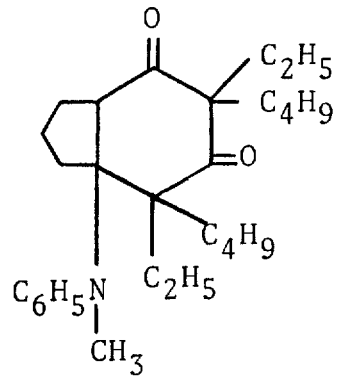

Column 8, lines 45 to 50, the right-hand formula should appear as shown below:

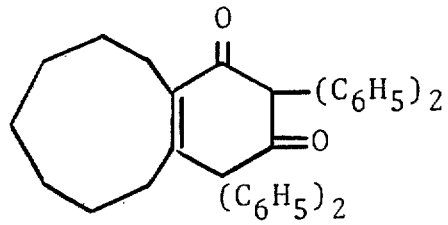

Column 10, line 28, claim reference numeral "7" should read -- 4 --.

Signed and sealed this 24th day of March 1970.

(SEAL)
Attest:

EDWARD M. FLETCHER, JR.                        WILLIAM E. SCHUYLER, JR.
Attesting Officer                                      Commissioner of Patents